Dec. 28, 1943.   A. L. ARENBERG   2,337,794
LIGHTING EQUIPMENT
Filed Aug. 2, 1940   2 Sheets-Sheet 1
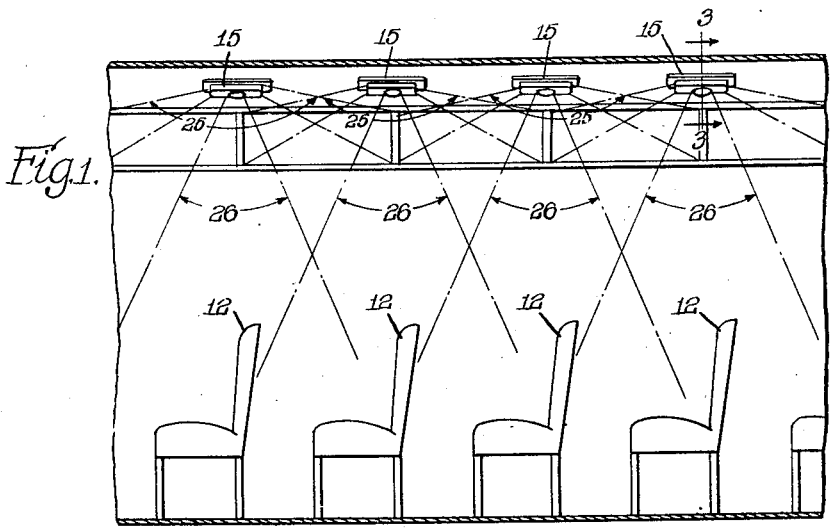
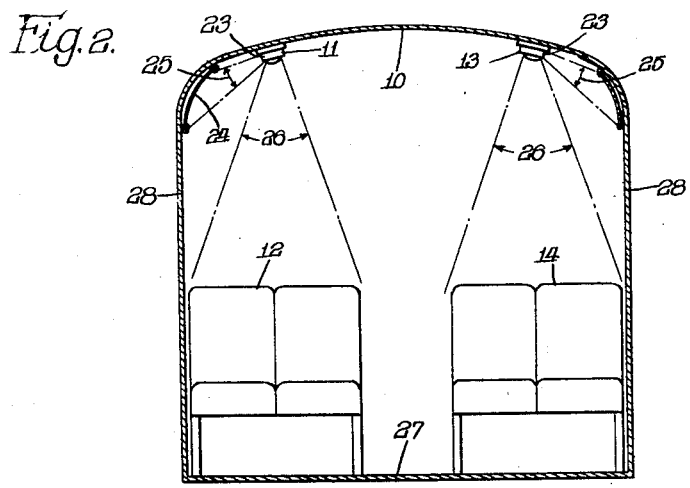
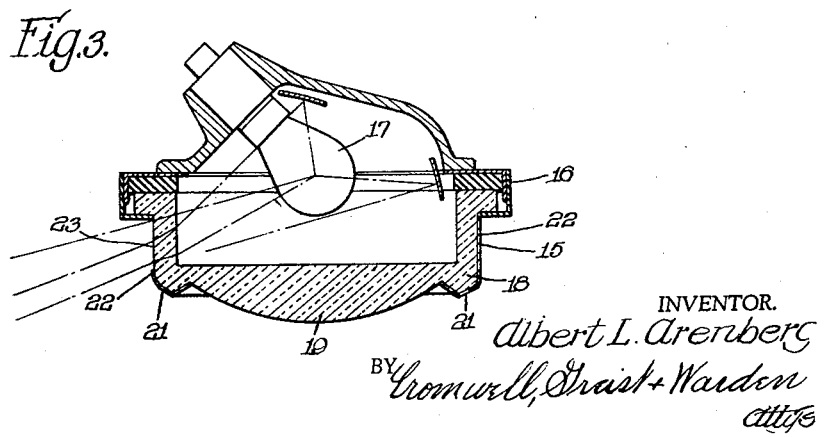
INVENTOR.
Albert L. Arenberg Dec. 28, 1943. A. L. ARENBERG 2,337,794
LIGHTING EQUIPMENT
Filed Aug. 2, 1940 2 Sheets-Sheet 2
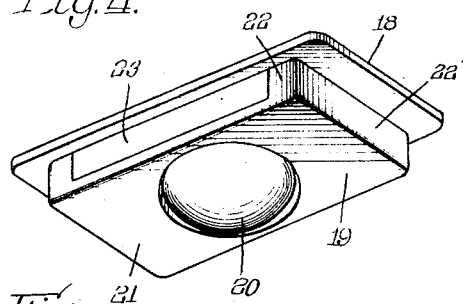
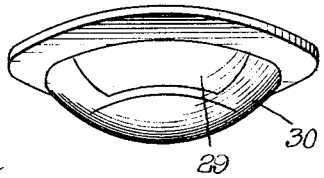
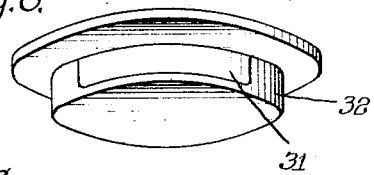
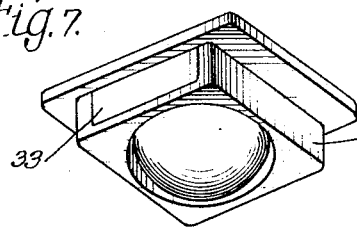
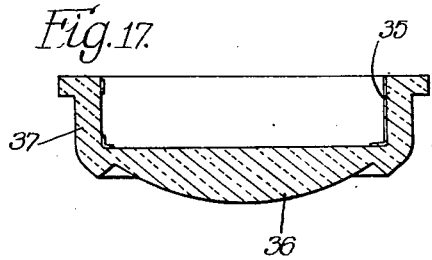
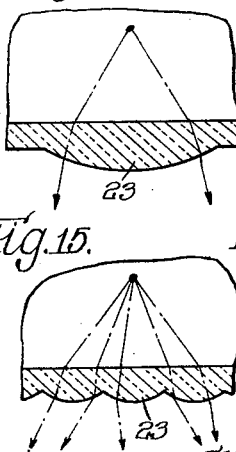
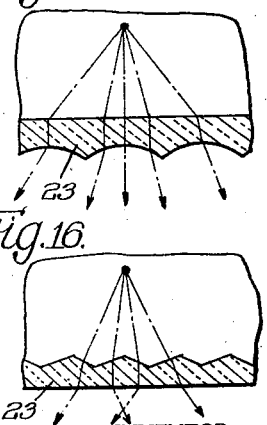
INVENTOR.
Albert L. Arenberg,
BY Cromwell, Greist & Warden
Attys.

Patented Dec. 28, 1943

2,337,794

UNITED STATES PATENT OFFICE 2,337,794

LIGHTING EQUIPMENT

Albert L. Arenberg, Highland Park, Ill., assignor to Patent License Corporation, Chicago, Ill., a corporation of Illinois Application August 2, 1940, Serial No. 349,763

3 Claims. (Cl. 240—7.35)

This invention has to do with lighting equipment, and is particularly concerned with lighting equipment suitable for use in illuminating the interiors of street railway cars, buses and other passenger vehicles.

The object of the invention is to provide an improved lighting fixture which is so constructed and arranged within the interior of the vehicle as to furnish high intensities of illumination for the reading matter of the passengers in the seats, high intensities of illumination for the advertising cards employed along the sides of the vehicle near the ceiling, and subdued lighting for the aisle, ceiling and other areas.

With the improved lighting fixture the reading matter of the passengers, and the advertising cards, are adequately illuminated, while the amount of light which falls on the forward surfaces of the passengers and other objects in the vehicle is limited to such an extent as to make such objects appear less brilliant as images in the windshield of the vehicle, thereby avoiding bright reflections in the windshield in the normal range of vision of the driver.

Other more specific objects and advantages of the invention will be apparent to those skilled in the art upon a full understanding of the lighting fixture and its arrangement within the vehicle.

While the improved lighting fixture is especially applicable to a one-light-over-a-seat arrangement, as covered in Arenberg Patent No. 2,020,273, it will of course be appreciated that the lighting fixture is capable of use in various other arrangements.

Several different embodiments of the invention are presented herein for the purpose of exemplification. The invention is susceptible of incorporation, however, in still other structurally modified forms coming equally within the scope of the appended claims.

In the accompanying drawings:

Fig. 1 is a vertical longitudinal section through a portion of a passenger vehicle equipped with lighting fixtures constructed and arranged in accordance with the invention;

Fig. 2 is a vertical transverse section through the same vehicle, showing the lighting fixtures arranged in two rows down the sides of the ceiling;

Fig. 3 is a vertical transverse section through one of the lighting fixtures, taken on the line 3—3 of Fig. 1;

Fig. 4 is a perspective view of the light transmitting glassware of one of the lighting fixtures;

Figs. 5, 6 and 7 are perspective views of three modified pieces of glassware;

Figs. 8 to 10 inclusive are sections through three different pieces of glassware, taken vertically through the card illuminating panels thereof, showing various modifications in the cross-section of the panels;

Figs. 11 to 16 inclusive are sections through six different pieces of glassware, taken horizontally through the centers of the card illuminating panels thereof, showing various modifications in the cross-section of the panels; and Fig. 17 is a vertical transverse section through another modified piece of glassware.

As will be observed in Figs. 1 and 2, a number of the lighting fixtures are used in a passenger vehicle. They are arranged in two rows, along the sides of the ceiling 10, with one row 11 of the fixtures above one row of seats 12 and the other row of fixtures 13 above the other row of seats 14, preferably in a one-light-over-a-seat arrangement.

Each of the fixtures 15 includes, in addition to the usual holder 16 and light source 17, a dished piece of glassware 18 (see Fig. 4) which is supported by the holder beneath and about the light source. This piece of glassware is provided in its bottom 19—preferably at its center—with a clear glass opening 20 which may advantageously be in the form of a condensing lens. The remaining portion 21 of the bottom 19, and the side walls 22, are enameled, frosted, or otherwise treated to render the same light diffusing, with the exception of a small panel 23 in the side wall 24 which faces toward the adjacent side of the vehicle, which panel is either left clear or else but lightly treated in order to permit the passage of a proportionately greater amount of light than the adjoining portions.

The panel 23 is so arranged with respect to the series of advertising cards 24 along the side of the ceiling as to direct a beam of light 25 onto the nearest card from the light source 17 in the fixture, while the lensed opening 19 is so arranged with respect to the row of seats beneath the same as to direct a beam of light 26 onto the reading plane of the seat immediately below the same, thereby providing ample light for the cards and for the reading planes, while materially restricting the amount of light passing to all intervening and surrounding areas and allowing only subdued illumination for the ceiling 10, aisle 27, walls 28, and other areas. The beams 25 from adjoining fixtures preferably overlap about half their width with each other, thereby affording continuous and uniform illumination for the entire series of cards. The beams 26 from adjoining fixtures also preferably overlap at the reading planes, thereby affording substantially shadowless illumination.

By properly shaping the panels 23 the beams 25 can be accurately controlled both as to height and width. Figs. 8, 9 and 10 show methods of lensing to accomplish vertical control of the beams, while Figs. 11 to 16 inclusive show various methods of lensing to accomplish horizontal control.

In Figs. 5, 6 and 7 are shown pieces of glassware of other shapes capable of providing the same results. In Fig. 5 the card-illuminating panel 29 is curved and is located in a circular side wall 30 which converges downwardly. In Fig. 6 the panel 31 is again curved and is located in a cylindrical side wall 32. In Fig. 7 the panel 33 is straight and is located in one of the side walls 34 of a square piece of glassware.

In the modification shown in Fig. 17 the desired density of the piece of glassware is obtained by applying a coat of enamel 35 to the inside surface, at all points except at the lens 36 and panel 37.

I claim:

1. In a passenger vehicle having an aisle, a row of seats along one side of the aisle, and a series of advertising cards along the same side of the ceiling, a row of lighting fixtures arranged above the seats for effecting controlled illumination of the aisle, seats, advertising cards and other areas within the interior of the vehicle, each of said fixtures comprising a piece of glassware having a clear light transmitting area in one portion for allowing light of high intensity to pass from a source of light to the reading matter of a passenger when seated in one of the seats, and having another light transmitting area in an angularly disposed portion for allowing light to pass to the adjacent advertising cards along the side of the ceiling, the remainder of the piece of glassware being of such character as to diffuse the light passing through the same and allow but a relatively small amount of light to pass to the aisle, ceiling and other areas within the interior of the vehicel.

2. In a passenger vehicle having an aisle, a row of seats along one side of the aisle, and a series of advertising cards along the same side of the ceiling, a row of lighting fixtures arranged above the seats for effecting controlled illumination of the aisle, seats, advertising cards and other areas within the interior of the vehicle, each of said fixtures comprising a dish-shaped piece of glassware having a relatively small clear light transmitting area in its bottom for allowing light of high intensity to pass from a source of light to the reading matter of a passenger when seated in one of the seats, and having another light transmitting area in one of its sides for allowing light to pass to the advertising cards along the side of the ceiling, the remainder of the bottom and sides of the piece of glassware being of such character as to diffuse the light passing through the same and allow but a relatively small amount of light to pass to the aisle, ceiling and other areas within the interior of the vehicle.

3. In a system for illuminating the interior of a passenger vehicle having a plurality of seats arranged in laterally spaced rows extending longitudinally of the vehicle and having provision in the upper side wall portions of the vehicle for the display of advertising matter in zones extending longitudinally of the vehicle above each row of seats, a plurality of lighting fixtures mounted in the ceiling of the vehicle, each of said fixtures including a fixed light source and a glass shade therefor, said shade being of generally rectangular form having a main panel and side walls surrounding the main panel, the central portion of the main panel of the shade and one of the long side walls thereof being transparent to light, the remaining portions of the shade being coated to render the same translucent, the fixtures being so mounted in relation to the seats and their shades being so disposed relatively to the light sources that light is directed downwardly through the transparent central portions of the shades to brightly illuminate relatively limited areas in the immediate vicinities of the seats and laterally through the transparent side walls of the shades to brightly illuminate relatively wide areas of the advertising matter displayed above the seats.

ALBERT L. ARENBERG.